O. B. THOMPSON & C. R. MOELLER.
ELECTRIC IGNITION SYSTEM FOR EXPLOSION ENGINES.
APPLICATION FILED MAR. 24, 1910.
987,188.
Patented Mar. 21, 1911.
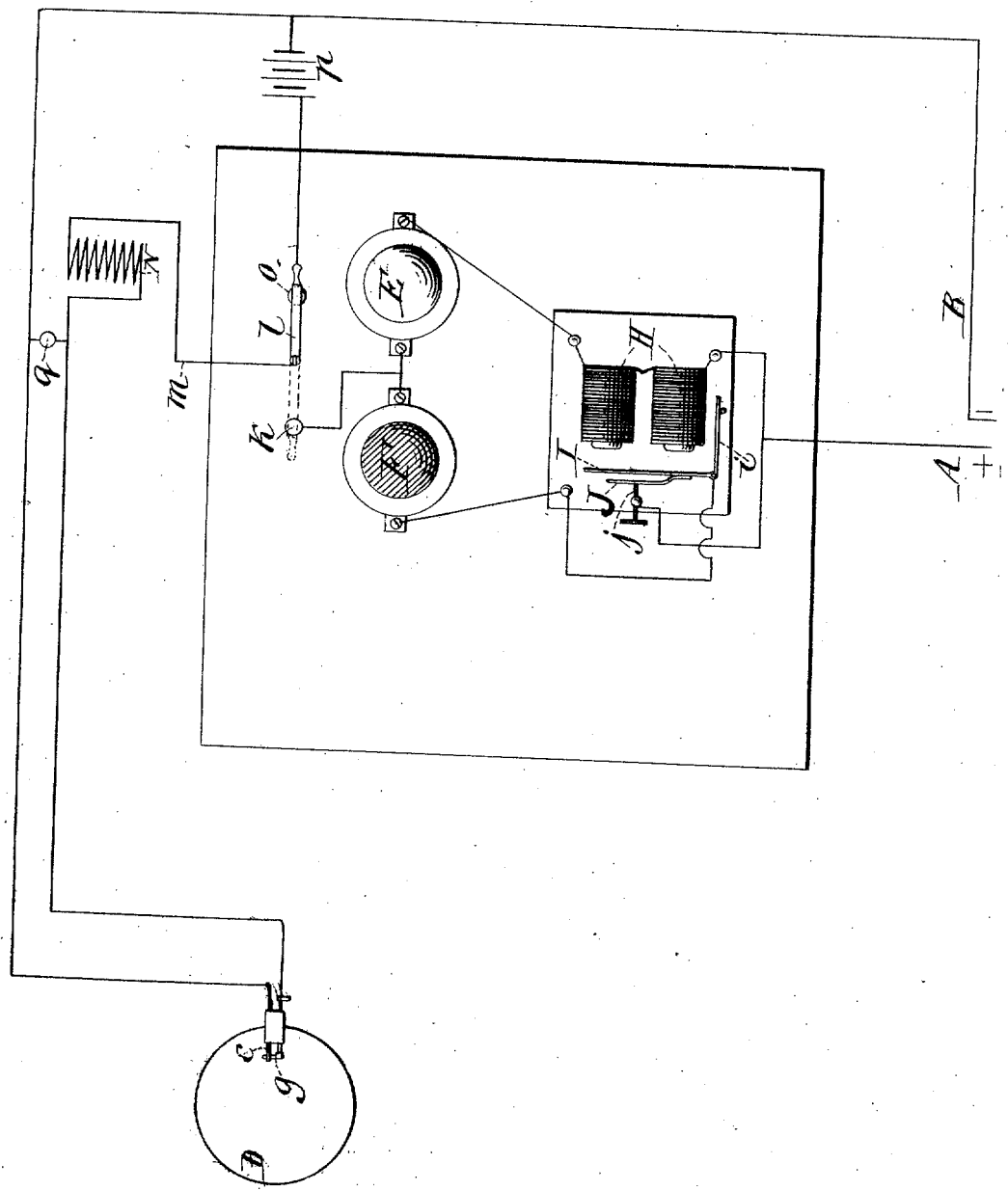

UNITED STATES PATENT OFFICE.

OLIVER B. THOMPSON AND CARL R. MOELLER, OF BUFFALO, NEW YORK.

ELECTRIC IGNITION SYSTEM FOR EXPLOSION-ENGINES.

987,188.  Specification of Letters Patent.  Patented Mar. 21, 1911.

Application filed March 24, 1910. Serial No. 551,278.

*To all whom it may concern:*

Be it known that we, OLIVER B. THOMPSON and CARL R. MOELLER, citizens of the United States, residing at Buffalo, in the county of Erie and State of New York, have invented new and useful Improvements in Electric Ignition Systems for Explosion-Engines, of which the following is a specification.

This invention relates to an ignition system for explosion engines.

Heretofore, the electric current for producing the spark for igniting the charges of explosive mixture in an engine was usually derived from a primary or storage battery for starting the engine and after the latter had been started it was customary, particularly in automobiles and motor boats, to then cut out the battery and generate the current for producing the spark by means of a magneto of small capacity or low voltage which was driven from the engine.

The object of the present invention is to provide an ignition system for an explosion engine in which a current of low voltage suitable for use in igniting the charges of fuel is derived from a current of electricity of comparatively high voltage, such as the out put of a dynamo installed either in the same building, boat or vehicle which contains the engine to be operated, or from a source outside and entirely disassociated from such building, boat or vehicle.

In carrying this invention into effect the high voltage put out by the dynamo on the main line is cut down by means of a resistance to a comparatively low voltage suitable for use in producing a spark for igniting the charges of fuel in the explosion engine, this resistance being preferably in the form of an incandescent lamp. In order, however, to prevent the explosion engine from becoming stalled or stopped if the incandescent resistance lamp should become broken, a reserve resistance is provided, which also preferably consists of an electric incandescent lamp of the proper voltage which is placed in the ignition circuit as a substitute for the broken lamp, so that the operation of the explosion engine may continue without interruption. This substitution of a new lamp for the broken one is preferably effected automatically, so that in the absence of the engineer or attendant no interruption may occur in the operation of the explosion engine.

When the engineer discovers that the first lamp has been burned out or broken it is his duty to replace this broken lamp by a new lamp and when this is done the circuit is automatically restored through this lamp and the second lamp cut out and held in reserve for use in the emergency of the first lamp becoming inoperative. In order to enable the engineer to determine with greater certainty that the first lamp has burned out and must be replaced, the first and second resistance lamps are preferably of different colors.

In this system a primary or storage battery is provided for use in starting the explosion engine or for running the same until a supply of current of high voltage on the main line is available. A spark coil is also embodied in this system to intensify the spark which is produced in the explosion engine, and a resistance, preferably in the form of an incandescent electric lamp, is arranged across the circuit between the spark coil and the make and break igniter of the engine for steadying the current and preventing the making and breaking of the circuit between the terminals of the igniter from disturbing the lamps and influencing to an appreciable extent the means whereby the current is shifted from one lamp resistance to the other.

The accompanying drawing is a diagrammatic representation of an ignition system for an explosion engine embodying our invention.

In this drawing A, B, represent the two main feed lines or supply wires which are connected with the opposite terminals of a dynamo which puts out a current of comparatively high voltage such as commonly used for commercial purposes, for instance, 110 to 220 volts. One of these main lines or wires is connected directly with one of the terminals $c$ of the make and break igniter in the firing space of an explosion engine D, the wire B being utilized for this purpose in the example shown in the drawing.

E, F represent the primary and secondary incandescent resistance lamps one or the other of which is interposed in the circuit between the supply of current at high voltage and the opposite terminal $g$ of the make and break igniter of the explosion engine so as to reduce the voltage sufficiently for use in igniting the charge of the fuel in the engine.

H represents the coil of an electromagnet forming part of the means whereby either the primary or the secondary resistance lamp is placed in circuit. One end of this coil is connected with the other main supply line A and the other end of this coil is connected with one side of the primary lamp E.

I represents an armature which is adapted to be attracted or moved forwardly by the poles of the electromagnet and $i$ a spring which returns or moves this armature backwardly when the circuit through the coil of the magnet is broken and the same becomes electrically deënergized. This armature is electrically connected by a wire or otherwise with one side of the other or secondary resistance lamp F. The forward and backward movement of the armature is utilized to cut the secondary lamp F into or out of circuit, this being preferably effected by means of a stationary contact $j$ connected with the main supply wire A and a movable contact J carried by the armature and adapted to engage with the stationary contact when the armature is in its rearward or outward position and to be disengaged from the stationary contact when the armature is in its forward or inward position. The opposite sides of the primary or secondary resistance lamps are connected with the terminal $k$ of a switch which is provided with a movable switch member or lever $l$ adapted to move into and out of engagement with the terminal or contact $k$ and is connected by means of a wire or line $m$ with the terminal $g$ of the make and break igniter of the explosion engine. Included in this wire $m$ is a spark coil N which operates to intensify the current supplied to the igniter terminals. On that side of the switch lever $l$ opposite to the contact $k$ is arranged another contact $o$ which is adapted to be engaged by this switch lever when it is desired to start the engine by means of a primary or secondary battery $p$ which is arranged between this last-mentioned contact and the main line B. The primary or secondary battery $p$ furnishes the current for starting the engine if the main source of electricity of high voltage is dependent upon the operation of the gas engine, and this battery may also be relied upon to furnish the current for running the engine in case the main supply of current of high voltage is supplied from a source wholly independent of the engine and this source should fail.

Across the circuit and preferably at a point between the spark coil and the igniter is arranged a steadying resistance $q$ preferably in the form of an incandescent electric lamp which operates to maintain the potential in the circuit in front of this resistance and prevents the opening and closing of the circuit behind this resistance by the terminals of the make and break igniter from perceptibly influencing the primary and secondary lamps and the electromagnet which controls the automatic switch, thereby causing the system to operate steadily and without any fluctuation.

Assuming that the main source of electricity of high voltage which is supplied by the main lines A, B is derived from a dynamo which is driven from the engine D, it then becomes necessary to start the engine from the starting battery $p$ and run the same on this battery until the engine has acquired the desired speed and the voltage of the dynamo has been raised sufficiently high. To utilize the starting battery for this purpose, the switch lever $l$ is turned so as to engage the contact $o$, as shown in full lines in the drawing. This ignition circuit is now closed through the battery $p$ and extends from one side of the same to the terminal $c$ of the engine igniter and returns from the other terminal $g$ to the other side of the battery and through the spark coil N, switch lever $l$ and contact $o$ included in this circuit. After the engine has been thus started the switch lever $l$ is turned over to the opposide side for engaging the contact $k$, as shown by dotted lines in the drawing. Assuming that in this reversed position of the switch lever both the primary and secondary resistance lamps are in condition for use the circuit would be closed through the primary lamp E and broken through the secondary lamp F. This is due to the fact that the current passes from the main line A successively through the coil of the electromagnet, a primary resistance lamp E, contact $k$, lever $l$, spark coil N, terminals $g$, $c$ and back through the other main line B, thereby energizing the electromagnet and causing its poles to attract the armature and separate the contacts $j$, J, whereby the circuit through the secondary resistance lamp F is broken.

If the main current is supplied to the wires A, B from a source independent of the gas engine D the latter may be started by throwing the switch lever $l$ into engagement with the contact $k$ and without first employing the battery $p$ for this purpose. While the resistance lamp E is in circuit it operates to reduce the voltage of the electric current from that at which it enters the main lines to such a voltage as is suitable for igniting the charges of fuel in the gas engine, say 4 to 15 volts. If the primary resistance lamp should burn out or become broken for any reason, the circuit including the coil of the electromagnet would become broken, thereby causing this magnet to become deënergized and the armature to be released. The instant this occurs the spring $i$ moves the armature outwardly or backwardly, whereby the contact thereof J engages the companion contact $j$, thereby closing the circuit through the secondary resistance lamp F and reëstablishing or completing the circuit of the main wires through the igniter of the gas engine. This shifting of the circuit from the primary to the secondary resistance lamp occurs automatically and instantly so that there is no interruption in the production of the spark in the cylinder of the gas engine and the latter continues to run. As soon as the engineer observes that the primary resistance lamp is extinguished and the secondary lamp lighted it is an indication to him that the engine is now running on the secondary lamp instead of the primary lamp. Although the engine will continue to run in this manner until the secondary lamp is also burned out or broken it is better for the engineer to immediately replace the broken primary lamp with a new one so as not to run the risk of stopping the gas engine altogether. As soon as a new lamp is substituted for the burned out primary lamp the circuit is again completed through the coil of the electromagnet, whereby the latter is energized, the electromagnet drawn forward and the circuit broken through the secondary lamp, this restoration of the circuit to the primary lamp being effected automatically by merely substituting a new lamp for the broken primary resistance lamp. By drawing the current for the igniter from a source of high voltage a strong spark is obtainable which insures reliable ignition of the charges of fuel and also keeps the amperage uniform, so that the spark is always of the same strength. The use of the resistance, however, cuts down the amperage and prevents an excessive current at the igniter terminals and therefore avoids undue burning of the latter. When batteries are used for supplying the current for the igniter the same varies constantly being of a high amperage when the battery is fresh or new and gradually lowering in amperage as the same becomes exhausted, thereby producing sparks which are not of uniform effectiveness.

We claim as our invention:

1. An electric ignition system for explosion engines comprising igniter terminals adapted to be arranged in the firing space of the engine, a main supply of electric current of high voltage, two resistances each having one side connected with one side of the circuit including said terminals, and automatic means for closing the circuit either through one of said resistances or the other.

2. An electric ignition system for explosion engines comprising igniter terminals adapted to be arranged in the firing space of the engine, a main supply of electric current of high voltage, two resistances each having one side connected with one side of the circuit including said terminals, and electromagnetic means for closing the circuit either through one of said resistances or the other.

3. An electric ignition system for explosion engines comprising igniter terminals adapted to be arranged in the firing space of the engine, a main supply of electric current of high voltage, two resistances consisting of incandescent electric lamps each having one side connected with one of said terminals, an electromagnet having an armature and a coil one end of which is connected with the opposite side of one of said lamps while the other end is connected with one line of said main supply, and a switch having two contacts, which are disengaged when the armature is attracted by the pole of said electromagnet and permitted to engage when the armature is released by said magnet, one of said contacts being connected with the opposite side of the other lamp and the other contact being connected with the same line of the main electric supply with which the opposite side of the first lamp is connected.

Witness our hands this 22nd day of March, 1910.

OLIVER B. THOMPSON.
CARL R. MOELLER.

Witnesses:
THEO. L. POPP,
ANNA HEIGIS.